United States Patent
Koushik et al.

(10) Patent No.: US 12,485,822 B2
(45) Date of Patent: Dec. 2, 2025

(54) GRIPPING SYSTEM FOR AN INDUSTRIAL VEHICLE

(71) Applicant: Volvo Truck Corporation, Gothenburg (SE)

(72) Inventors: K S Sudeendra Thirtha Koushik, Bangalore (IN); Gangubai Hegde, Bangalore (IN); Kaveesha Purushothama, Karnataka (IN); K S Madhuchandra, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 156 days.

(21) Appl. No.: 17/960,364

(22) Filed: Oct. 5, 2022

(65) Prior Publication Data
US 2023/0114629 A1    Apr. 13, 2023

(30) Foreign Application Priority Data
Oct. 12, 2021    (EP) .................................... 21202224

(51) Int. Cl.
*B60R 3/00* (2006.01)
(52) U.S. Cl.
CPC .................................. *B60R 3/005* (2013.01)
(58) Field of Classification Search
CPC ......... B60R 3/002; B60R 3/005; B60R 3/007; B60R 3/02; B60R 3/00
See application file for complete search history.

(56) References Cited

U.S. PATENT DOCUMENTS

| | | | | |
|---|---|---|---|---|
| 3,171,671 A | * | 3/1965 | Cornett | B60R 3/00 182/91 |
| 3,883,844 A | * | 5/1975 | Wood, II | B60R 3/02 200/86 R |
| 3,971,456 A | * | 7/1976 | Yonce | B60R 3/00 280/163 |
| 3,986,503 A | * | 10/1976 | Le Guillon | B60R 3/02 182/89 |
| 4,750,753 A | * | 6/1988 | Dezern | B60R 3/02 224/497 |
| 5,538,265 A | * | 7/1996 | Chen | B60R 3/02 280/166 |

(Continued)

FOREIGN PATENT DOCUMENTS

| | | | |
|---|---|---|---|
| DE | 102007039804 A1 | * 2/2009 | ............... B60J 5/10 |
| DE | 102018004019 A1 | 12/2018 | |

OTHER PUBLICATIONS

Extended European Search Report for European Patent Application No. 21202224.8, mailed Mar. 3, 2022, 7 pages.

*Primary Examiner* — Jason D Shanske
(74) *Attorney, Agent, or Firm* — Withrow & Terranova, PLLC (57) ABSTRACT

A gripping system for helping a user climbing over a substantially vertical surface of an industrial vehicle, the gripping system comprising a grip member configured for being installed in a recessed area of a bodywork element, a closure member movable between a first position in which the closure member closes the recessed area, and a second position in which the recessed area is opened so that the grip member can be grasped, in which the closure member is configured for moving from the first position to the second position under a pushing action of the user.

15 Claims, 9 Drawing Sheets

(56) References Cited

U.S. PATENT DOCUMENTS

| | | | | |
|---|---|---|---|---|
| 5,566,962 A | * | 10/1996 | Burnham | B60R 3/00 |
| | | | | 182/127 |
| 2003/0051931 A1 | * | 3/2003 | Johansson | B60R 3/02 |
| | | | | 180/69.2 |
| 2008/0163555 A1 | * | 7/2008 | Thomas | E05B 85/01 |
| | | | | 292/336.3 |
| 2013/0125472 A1 | * | 5/2013 | Polewarczyk | E05B 81/77 |
| | | | | 49/460 |
| 2013/0154229 A1 | * | 6/2013 | Kim | B60R 3/02 |
| | | | | 280/163 |
| 2018/0290596 A1 | * | 10/2018 | Fukushima | B60R 3/005 |
| 2020/0001793 A1 | * | 1/2020 | Lynch | B60R 19/48 |

* cited by examiner

FIG. 9

GRIPPING SYSTEM FOR AN INDUSTRIAL VEHICLE

RELATED APPLICATIONS

The present application claims priority to European Patent Application No. 21202224.8, filed on Oct. 12, 2021, and entitled "GRIPPING SYSTEM FOR AN INDUSTRIAL VEHICLE," which is incorporated herein by reference in its entirety.

TECHNICAL FIELD

This disclosure relates to a gripping system for equipping a heavy-duty vehicle, in particular a truck.

BACKGROUND ART

Cleaning the windscreen of a heavy-duty vehicle like a truck may require to climb over the vehicle to reach a sufficient height. In order to safely perform this task, the front of the truck may be equipped with a handle extending horizontally and located near the bottom of the windscreen. The person intending to clean the windscreen may climb by stepping on a footboard and at the same time catching the handle with one hand. The person can then clean the windscreen with her free hand, while still holding the handle to keep balance. When the task is completed, the person can get down while still taking support from the handle. Several handles can be disposed along the width of the truck, to provide support in several locations so the entire width of the windscreen can easily be accessed.

Such handles usually protrude from the front surface of the truck and impair the air flow on the front surface of the truck. The drag coefficient of the truck gets higher, which ultimately means higher energy consumption for driving the truck. Furthermore, whistling noise may appear at certain speeds because of the protrusion of the handle.

Consequently, there is a need to propose a gripping system that doesn't deteriorate drag coefficient while still helping users to safely climb over the bodywork of the truck.

SUMMARY

It is proposed a gripping system for helping a user climbing over a substantially vertical surface of an industrial vehicle, the gripping system comprising:
  a grip member configured for being installed in a recessed area of a bodywork element,
  a closure member movable between:
    A first position in which the closure member closes the recessed area, and
    A second position in which the recessed area is opened so that the grip member can be grasped,
  in which the closure member is configured for moving from the first position to the second position at least under a pushing action of the user.

The grip member is housed in a recessed area 3 which can be closed by a closure member. When the grip member 2 is not in use, it doesn't protrude from the external surface of the bodywork/cabin of the vehicle. The aerodynamic drag is therefore reduced. When a user wants to use the grip member for climbing over the surface of the vehicle, he just has to push the flap open to access the grip member. Vehicle efficiency is optimized without compromising ease of use.

The following features, can be optionally implemented, separately or in combination one with the others:

The industrial vehicle can be a truck, for example a tractor truck trailer/carrier, or a dump truck. The industrial vehicle can also be a bus.

According to one aspect of the invention, the closure member is configured to be flush with the bodywork element when the closure member is in the first position.

Therefore, the shape of the bodywork can be smooth and sleek when the grip member is not in use. When the truck is running the aerodynamic drag of the truck 100 is not impaired by the presence of the grip member in the airstream around the bodywork. Furthermore, the risk of having whistling noises due to the presence of the grip member is eliminated, since the grip member is not in the air flow.

According to another aspect of the invention, the gripping system comprises an elastic spring configured to deform when the closure member is moved from the first position to the second position.

In an embodiment of the gripping system, the elastic spring is preloaded so that a minimal force to be exerted to move the closure member from the first position to the second position is higher than a predetermined threshold.

In one embodiment, the elastic spring is an helical spring.

According to one embodiment of the gripping system, the closure member is rotatable along a rotation axis.

In another embodiment, the elastic spring is a torsion spring.

The torsion spring is coaxial with a rotation axis of the closure member.

According to an embodiment of the gripping system, the closure member is rotatable around a rotation axis, and the rotation axis of the closure member is horizontal when the gripping system is orientated in the nominal installation position in the industrial vehicle.

In a different embodiment, the rotation axis of the closure member is vertical when the gripping system is orientated in the nominal installation position.

According to an embodiment, the grip member is located below a bottom edge of the closure member 5.

In an embodiment, the closure member is moved inwards of the recessed area when the closure member is moved from the first position to the second position.

In an implementation variant, the closure member is configured to swing upward when the closure member is moved from the first position to the second position.

In another implementation variant, the closure member is configured to swing downward when the closure member is moved from the first position to the second position.

The closure member has an angular stroke comprised between 70° and 110°.

In an embodiment of the gripping system, the grip member is a handle.

In another embodiment, the grip member is a grabbing pad.

According to an embodiment, the gripping system further comprises:
  a step rotatable between a stowed position and a deployed position,
  a locking mechanism configured to block the closure member when the step is in the stowed position, and configured to release the closure member when the step is in the deployed position.

The locking mechanism comprises a locking pin configured to be inserted in a bore of the closure member.

The locking pin can have a translation motion along an axis.

The locking mechanism comprises a cable linking the step and the locking pin.

According to another embodiment, the gripping system further comprises:

- a step rotatable between a stowed position and a deployed position,
- an actuation device configured for moving the closure member from the first position to the second position when the rotatable step is moved from the stowed position to the deployed position.

For example, the actuation device comprises a cable linking the closure member and the step.

In an implementation example, a first end of the linking cable is fixed to the step and a second end of the cable is fixed to the closure member.

The step is horizontally hinged. The first end of the cable is distant from the rotation axis of the step. The second end of the cable is distant from the rotation axis of the closure member.

In another embodiment, the gripping system comprises a position sensor configured for detecting a position of the step, and the actuation device comprises an electric motor and a transmission mechanism configured to move the closure member from the first position to the second position when the step is in the deployed position.

The electric motor and the transmission mechanism are configured to move the closure member from the second position to the first position when the step is in the stowed position.

In an embodiment, the gripping system comprises a safety switch configured to deactivate the actuation device.

In an embodiment of the gripping system, the transmission mechanism comprises a gear train.

In an implementation variant, the gear train comprises a worm-screw which drives a gear.

The invention also relates to a truck comprising a gripping system as described earlier.

The safety switch is configured to deactivate the actuation device when the ignition key of the truck is in the powered-up position.

According to an embodiment, the bodywork element in which the grip member is installed is a front surface of the truck.

In a variant, an axis of rotation of the step 7 is parallel to a transverse axis of the truck.

In another variant, an axis of rotation of the step is parallel to a longitudinal axis of the truck.

The grip member may extend transversely along more than one half of a width of the truck 100.

The truck may comprise at least two gripping systems as described earlier.

The at least two gripping systems may have a common closure member.

The at least two gripping systems may be independent. In other words, each gripping system has its own closure member and its own associated grip member.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, ie designated for example by first element or second element, or first parameter and second parameter, etc. The purpose of this indexing is to differentiate elements or parameters that are similar, but not identical. This indexing does not imply the priority of one element, or one parameter over another, and names can be interchanged. When it is mentioned that a subsystem comprises a given element, the presence of other elements in this subsystem is not excluded.

Figure 8:
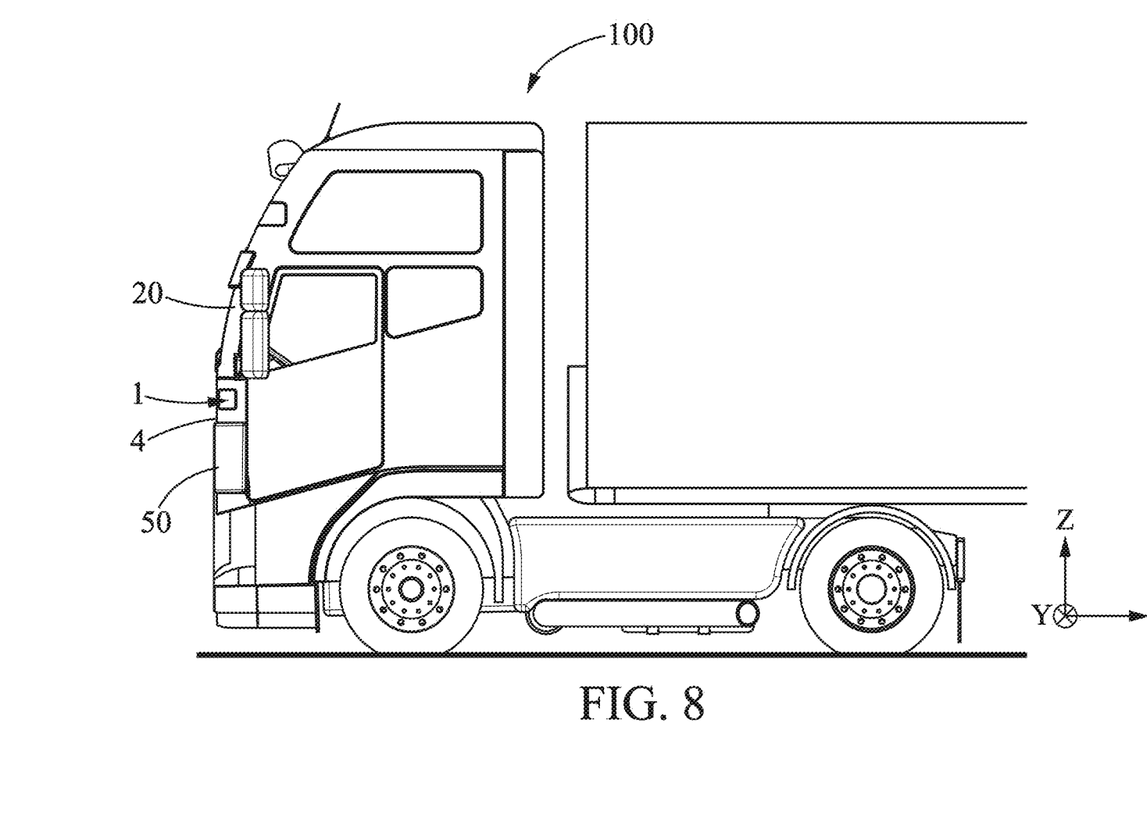
FIG. 8 is a general view of a heavy-duty vehicle on which a gripping system according to the invention is implemented.

It is now referred to FIG. 8. FIG. 8 illustrates an industrial vehicle 100 comprising a gripping system 1 according to the invention. On the illustrated example, the industrial vehicle 100 is a truck. According to not represented examples, the industrial vehicle can be a dump truck, or a bus.

The present invention relates to a gripping system 1 for helping a user climbing over a substantially vertical surface 50 of an industrial vehicle 100, the gripping system 1 comprising:

- a grip member 2 configured for being installed in a recessed area 3 of a bodywork element 4,
- a closure member 5 movable between:
  A first position C in which the closure member 5 closes the recessed area 3, and
  A second position O in which the recessed area 3 is opened so that the grip member 2 can be grasped,
- in which the closure member 5 is configured for moving from the first position C to the second position O at least under a pushing action of the user.

Within the context of the present disclosure, substantially vertical means that the surface 50 to climb over is vertical or close to vertical, depending on the exact shape of the bodywork of the industrial vehicle. The surface 50 forms an angle higher than 70° with the surface of the road on which the industrial vehicle is driven. When an operator wants to work over the surface 50 of the vehicle, for example for cleaning the windscreen 20, he needs to hoist himself up along the surface 50 of the vehicle 100. A gripping system 1 provides a strong support to keep one's balance and reduce the risk of fall and resulting injuries. The gripping system 1 is also called a hand holding system, or a hand support system.

The grip member 2 is housed in a recessed area 3 which can be closed by a closure member 5. The recessed area 3 forms a cavity. This cavity is not necessarily closed. The bottom of the cavity may comprise holes to ensure drainage of rainwater or possible condensation of humidity. The closure member 5 of the recessed area is for example a flap. When the grip member 2 is not in use, it doesn't protrude from the external surface of the cabin of the vehicle. No aerodynamic disturbances are generated by the grip member 2. Drag coefficient is therefore reduced, and aerodynamic noises are eliminated, or at least largely reduced. When a user needs to use the grip member 2 for climbing over the surface 50 of the vehicle, he just has to push the closure member 5 open to access the grip member 2 and grab it. Vehicle efficiency is optimized without compromising ease of use. In all embodiments, the closure member 5 may always be pushed by the user. In some embodiments, the closure member 5 can be moved as well by other means which can provide an automatic actuation of the closure member, as it will described in detail later.

When the closure member 5 is in the first position C, it blocks the access to the grip member 2. The first position C is called blocking position. The grip member 2 is concealed when the closure member 5 is in the first position C. The first position C is also called concealed position.

The grip member 2 is accessible when the closure member 5 is in the second position O. In other words, a user can grasp the grip member 2 so that he can climb over the vertical surface 50 by supporting at least a fraction of his weight on the grip member 2. The second position O is said revealing position. The user can secure its standing position; improving its safety while working along the substantially vertical surface of the industrial vehicle.

The closure member 5 should be large enough to provide access from various angles of approach of the forearm of the user. The closure member 5 is for example 20 centimeters wide and 10 centimeters high. The closure member 5 may be a metal sheet. The closure member 5 may be a plastic injected part. The closure member 5 may be the same color as the neighboring bodywork for better integration.

The closure member 5 is for example rectangular. Any shape is possible, as long as it is adapted to the passage of a hand and wrist of the users, and as long as the closure member 5 can be moved from the blocking position C to the revealing position O without interfering with other elements.

According to one aspect of the invention, the closure member 5 is configured to be flush with the bodywork element 4 when the closure member 5 is in the first position C. Therefore, the shape of the bodywork can be smooth and sleek when the grip member 2 is not in use. When the truck 100 is running, the aerodynamic drag of the truck 100 is not compromised by the presence of the grip member 2.

According to another aspect of the invention, the gripping system comprises an elastic spring 6 configured to deform when the closure member 5 is moved from the first position C to the second position O. In other words, the closure member 5 is moved from the first position C to the second position O against the action of an elastic spring 6. The elastic spring 6 brings back the closure member 5 in the first position C when the user releases his grip on the grip member 2. Therefore, the closure member 5 comes back into the first position once a user removes his hand from the gripping system 1.

In an embodiment of the gripping system, the elastic spring 6 is preloaded so that a minimal force to be exerted to move the closure member 5 from the first position C to the second position O is higher than a predetermined threshold Th.

The elastic spring 6 is preloaded, or pre-stressed, so that it tends to press the closure member 5 against an end-stop that defines the position of the closure member 5 when it is in the first position C. The elastic spring 6 prevents the closure member 5 from moving from the first position C to the second position O when the user exerts no action on the closure member 5. The elastic spring preload is designed so that the closure member 5 doesn't move under the action of the aerodynamic pressure or under the action of road vibrations, ensuring that the closure member 5 remains firmly in the first position C when the gripping system 1 is not in use. The efficiency of the device is maintained even the vehicle travels at maximum speed with wind opposite to travelling direction, and possible rattling noises of closure member 5 oscillations are avoided.

Figure 2:
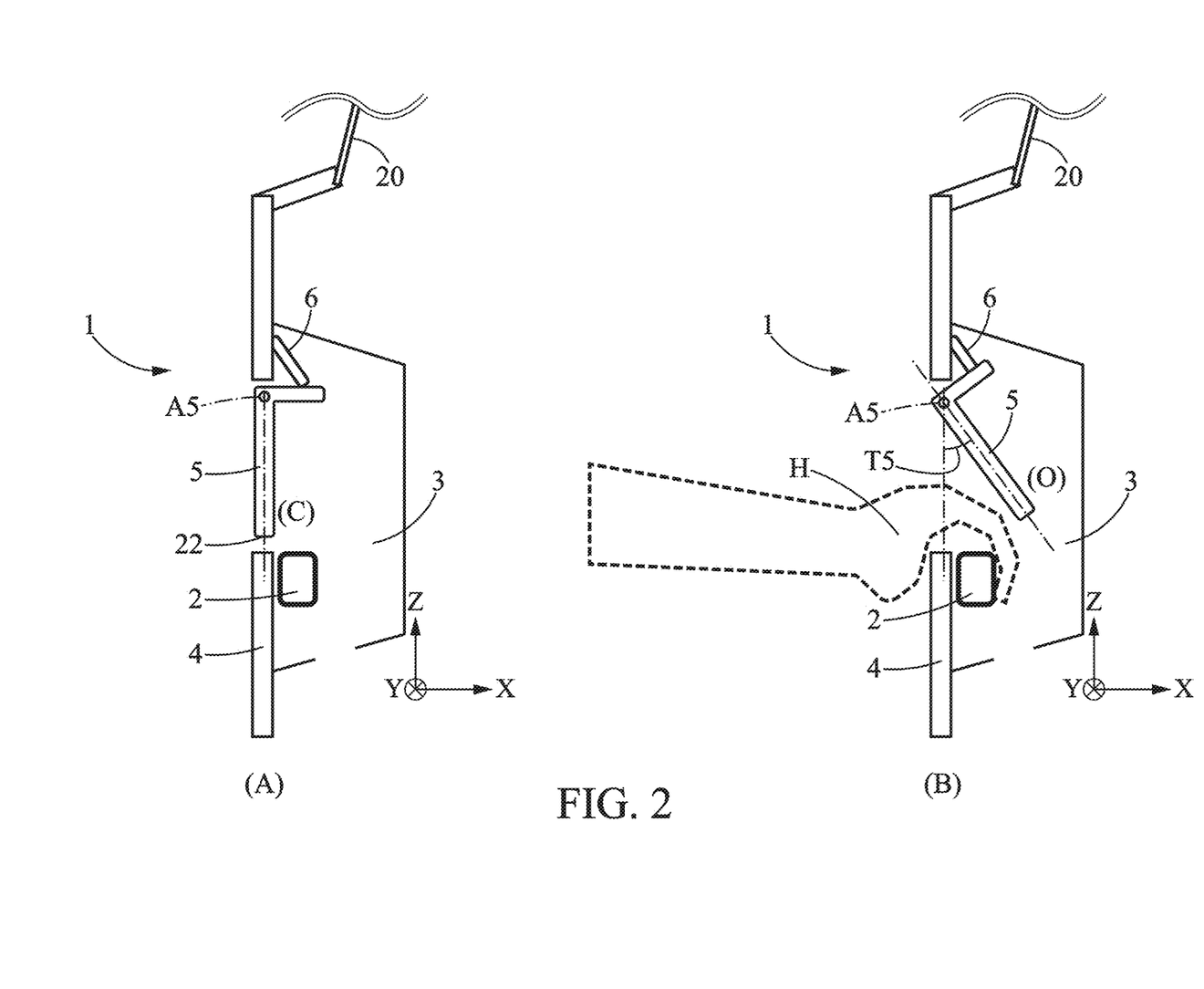
FIG. 2 is a schematic side view of a gripping system according to a second embodiment.

In one embodiment, illustrated for example on FIG. 2, the elastic spring 6 is an helical spring. The elastic spring 6 can be compressed when the closure member 5 is moved from the first position C to the second position O. In a variant, the elastic spring 6 can be stretched when the closure member 5 is moved from the first position C to the second position O.

In the illustrated embodiments of the gripping system 1, the closure member 5 is rotatable along a rotation axis A5.

Figure 1:
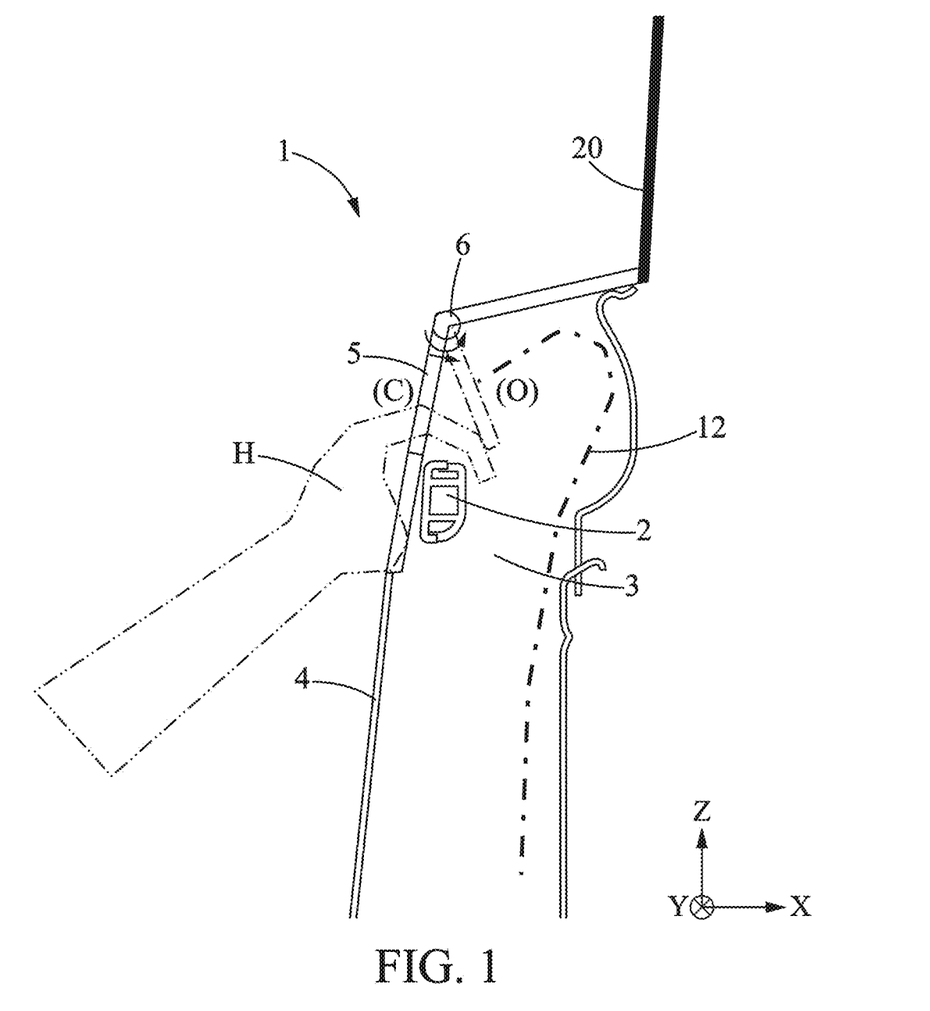
FIG. 1 is a schematic side view of a gripping system according to a first embodiment.

In a first embodiment illustrated on FIG. 1, the elastic spring 6 is a torsion spring. The torsion spring is coaxial with a rotation axis A5 of the closure member 5.

In the illustrated embodiments, the closure member 5 is rotatable around a rotation axis A5, and the rotation axis A5 of the closure member 5 is horizontal when the gripping system 1 is orientated in the nominal installation position in the industrial vehicle 100. What is called nominal installation position in the industrial vehicle 100 is the position when the gripping system 1 is fully assembled on a vehicle, with the vehicle rolling on a horizontal road. In other words, the axis of the rotation of the closure member 5 is parallel to the plane defined by a longitudinal axis X and a transverse axis Y of the industrial vehicle. The longitudinal axis X is by definition the front-rear axis of the vehicle, and the transverse axis Y is the left-right axis. Similarly, the top edge and bottom edge of the closure member 5, upwards and downward directions are defined when the gripping system 1 is orientated the same way as its nominal installation position in the industrial vehicle 100.

In a different embodiment, which is not represented, the rotation axis of the closure member 5 is vertical when the gripping system 1 is orientated in the nominal installation position. In other words, the rotation axis of the closure member 5 is in this case perpendicular to both the longitudinal axis X and the transverse axis Y of the industrial vehicle 100.

According to a second embodiment, represented on FIG. 2, the grip member 2 is vertically located below a bottom edge 22 of the closure member 5.

In the represented embodiments, the closure member 5 is moved inwards of the recessed area 3 when the closure member 5 is moved from the first position C to the second position O. The shutter 5 is moved towards the interior of the recessed area 3 when the closure member 5 is rotated from the first position C to the second position O. The closure member 5 doesn't protrude out of the cabin body surface.

In the embodiments illustrated on FIG. 1 and FIG. 2, the closure member 5 is configured to swing upward when the closure member 5 is moved from the first position C to the second position O. The closure member 5 is configured to swing away from the grip member 2. The rotation axis A5 of the closure member 5 is located near a top edge of the closure member 5.

Figure 3:
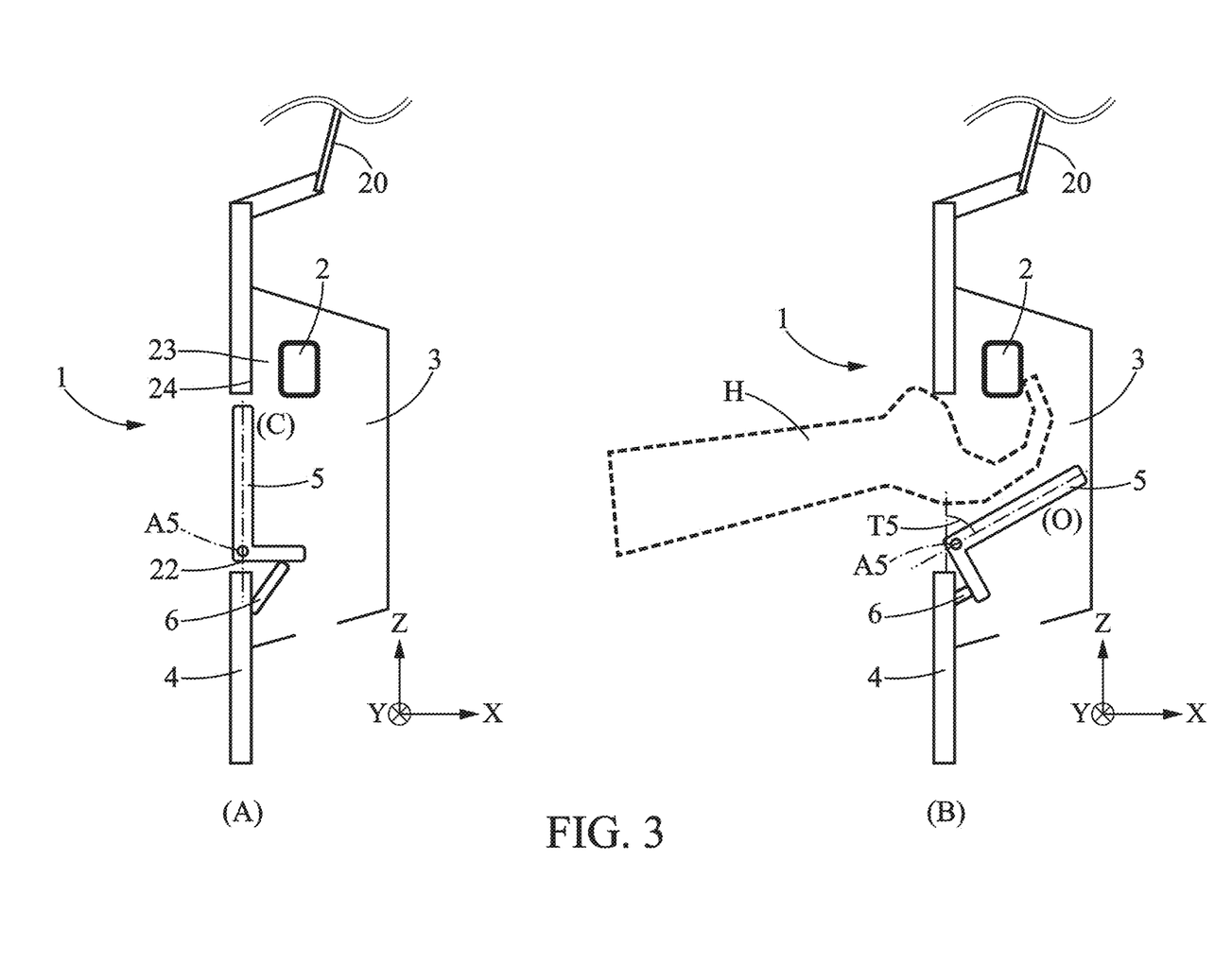
FIG. 3 is a schematic side view of a gripping system according to a third embodiment.

In a third embodiment, illustrated on FIG. 3, the closure member 5 is configured to swing downward when the closure member 5 is moved from the first position C to the second position O. The rotation axis A5 of the closure member 5 is located near a bottom edge 22 of the closure member 5. On both FIG. 2 and FIG. 3, the part A of the figure represents the gripping system 1 with the grip member 2 in the first position C. The part B of these figures represent the gripping system 1 with a hand H of a user in contact with the grip member 2.

The closure member 5 has an angular stroke T5 comprised between 70° and 110°. In other words, the closure member 5 rotates by an angle T5 comprised between 70° and 110° when it is moved from the first position C to the second position O.

In the embodiments of the gripping system 1 illustrated on FIGS. 1 to 3, the grip member 2 is a handle. The grip member 2 has an elongated shape, and a clearance 23 is left between this elongated shape and the facing wall 24. The user can encircle the elongated shape with his hand to get a strong support. The handle can be a metal sheet put into shape, like a steel sheet. The handle can also be an aluminum casting.

Figure 5:
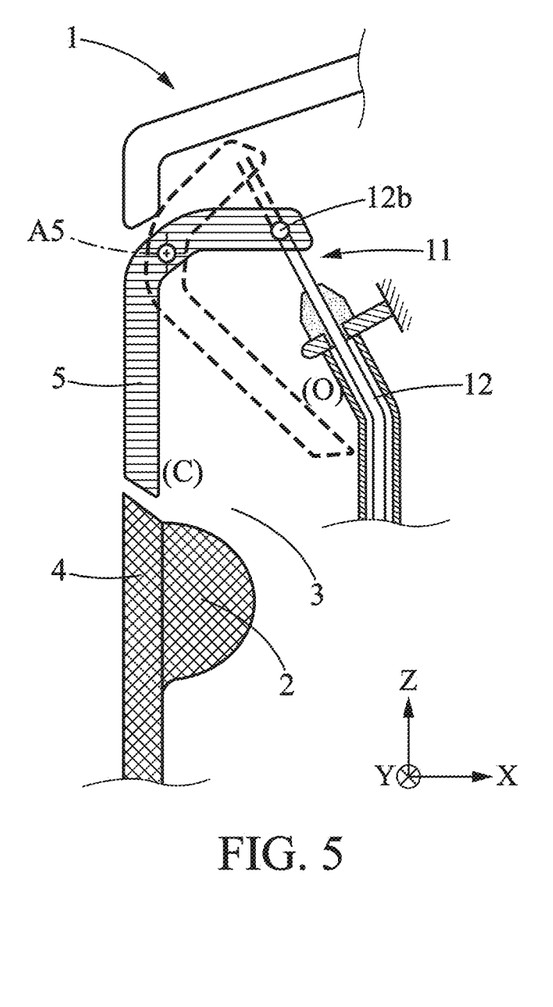
FIG. 5 is a schematic side view of a gripping system according to a fifth embodiment.

In another embodiment, illustrated on FIG. 5, the grip member 2 is a grabbing pad. The grabbing pad forms a protrusion that the hand of the user can grab. The grabbing pad 2 can be a rubber block. The grabbing pad can also be an injected plastic part.

Figure 4:
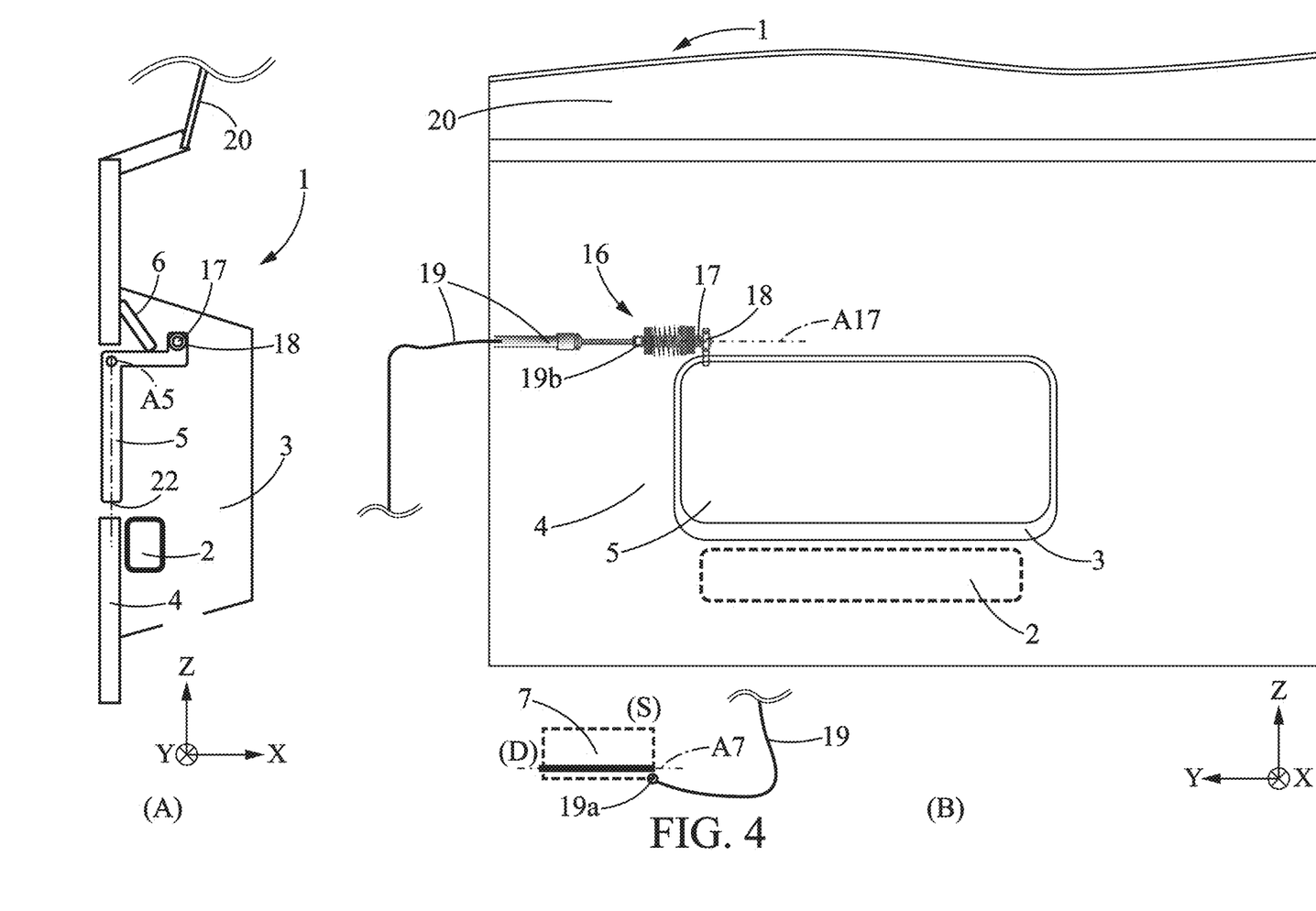
FIG. 4 is a schematic view of a gripping system according to a fourth embodiment.

According to a fourth embodiment, the gripping system 1 further comprises:
- a step 7 rotatable between a stowed position S and a deployed position D,
- a locking mechanism 16 configured to block the closure member 5 when the step 7 is in the stowed position S, and configured to release the closure member 5 when the step 7 is in the deployed position D.

Figure 9:
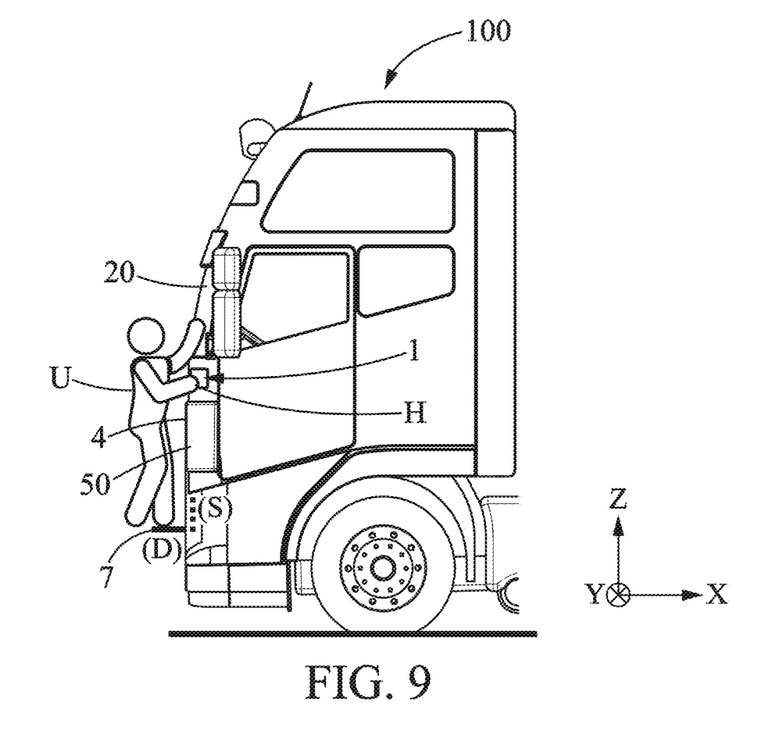
FIG. 9 is a general view of the heavy-duty vehicle of FIG. 7 while the gripping system is in use.

The rotatable step 7, illustrated on FIG. 9, is configured for providing a bearing surface on which a user U can lean when the step 7 is in the deployed position D. In other words, the step 7 protrudes from the front of the truck 100 when the step 7 is in the deployed position D. The step 7 can be deployed by a user when he needs to climb, and put back in stowed position when it's not needed any more The user U can hoist himself up along the substantially vertical surface 50 of the truck 100 by placing one foot on the deployed step 7 and grabbing at the same time the grip member 2 with one hand H to support his weight and improve his balance. He can then with his free hand perform a task such as washing the windscreen 20 of the truck 100. The rotatable step 7 is optional. A fixed step, or set of fixed steps, located on the side of the truck to assist the driver or the passenger in getting into the cabin, may also be used to gain access to the gripping system 1. When the step 7 is in stowed position S, it remains within the external boundaries of the bodywork of the truck. There's no protrusion of the step 7 when it is in the stowed position S. On FIG. 9, the stowed position S of the step 7 is represented with a dotted line and the deployed position D is represented with a plain line.

The locking mechanism 16 is illustrated on FIG. 4. The locking mechanism 16 comprises a locking pin 17 configured to be inserted in a bore 18 of the closure member 5. The locking pin 17 can have a translation motion along an axis A17.

The locking mechanism 16 comprises a cable 19 linking the step 7 and the locking pin 17. A first end 19a of the linking cable 19 is fixed to the step 7 and a second end 19b of the cable 19 is fixed to the locking pin 17. On FIG. 4, the cable 19 is represented in two separated portions only for clarity. When the step 7 is in the stowed position S, the locking pin 17 rests inserted in the bore 18 of the closure member 5. The closure member 5 can't be moved even if the user tries to push it open. When the step 7 is moved from the stowed position S to the deployed position D, the cable 19 pulls the locking pin 17 out of the bore 18, thus releasing the closure member 5. The closure member 5 may then be moved. Part A of FIG. 4 is a side view, and part B of FIG. 4 is a front view. Other kinds of locking mechanism can also be used, with for example a rotating blocking element.

A fifth and a sixth embodiment provide automated opening of the closure member 5.

For this, the gripping system 1 further comprises:
- a step 7 rotatable between a stowed position S and a deployed position D,
- an actuation device 11 configured for moving the closure member 5 from the first position C to the second position O when the rotatable step 7 is moved from the stowed position S to the deployed position D.

In this configuration, deploying the step 7 automatically moves the closure member 5 so that the grip member 2 is readily available. The user doesn't have to push the closure member 5 opened to access the grip member 2.

Different actuation devices can be implemented. In the fifth embodiment, illustrated on FIG. 5 and FIG. 6, the actuation device 11 comprises a cable 12 linking the closure member 5 and the step 7. A first end 12a of the linking cable 12 is fixed to the step 7 and a second end 12b of the cable 12 is fixed to the closure member 5.

Figure 6:
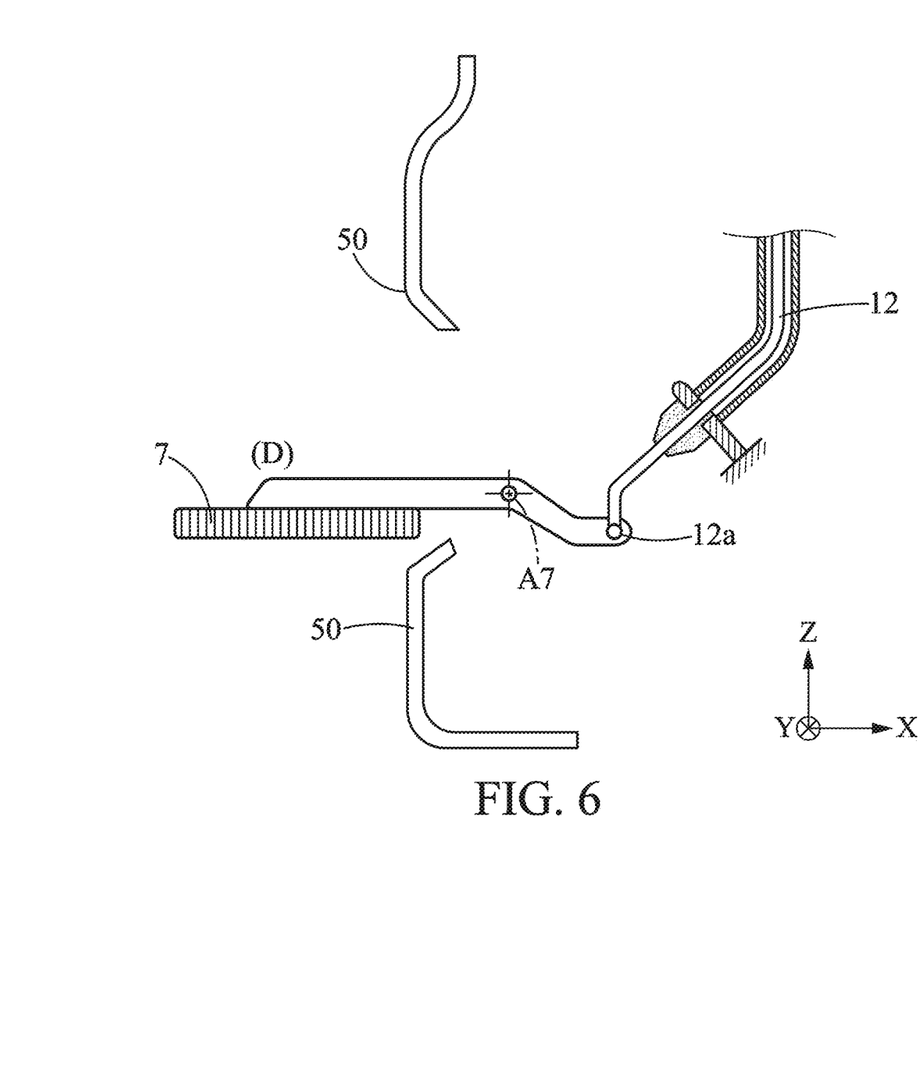
FIG. 6 is another schematic side view of the gripping system of FIG. 5.

The step 7 is horizontally hinged, as represented on FIG. 6 and FIG. 9. The first end 12a of the cable 12 is distant from the rotation axis A7 of the step 7. The axis of rotation A7 of the step 7 is here parallel to a transverse axis Y of the truck. The second end 12b of the cable 12 is distant from the rotation axis A5 of the closure member 5. When the step 7 is moved from the stowed position S to the deployed position D, the cable 12 pushes the closure member 5 opened against the action of the return spring 6. When the step 7 is moved back from the deployed position D to the stowed position S, the cable 12 doesn't push the closure member 5 anymore and the return spring 6 brings the closure member 5 back into the first position C. The return spring has not been represented on FIGS. 5 and 6. In a non-represented variant, an axis of rotation A7 of the step 7 is parallel to a longitudinal axis X of the truck.

Figure 7:
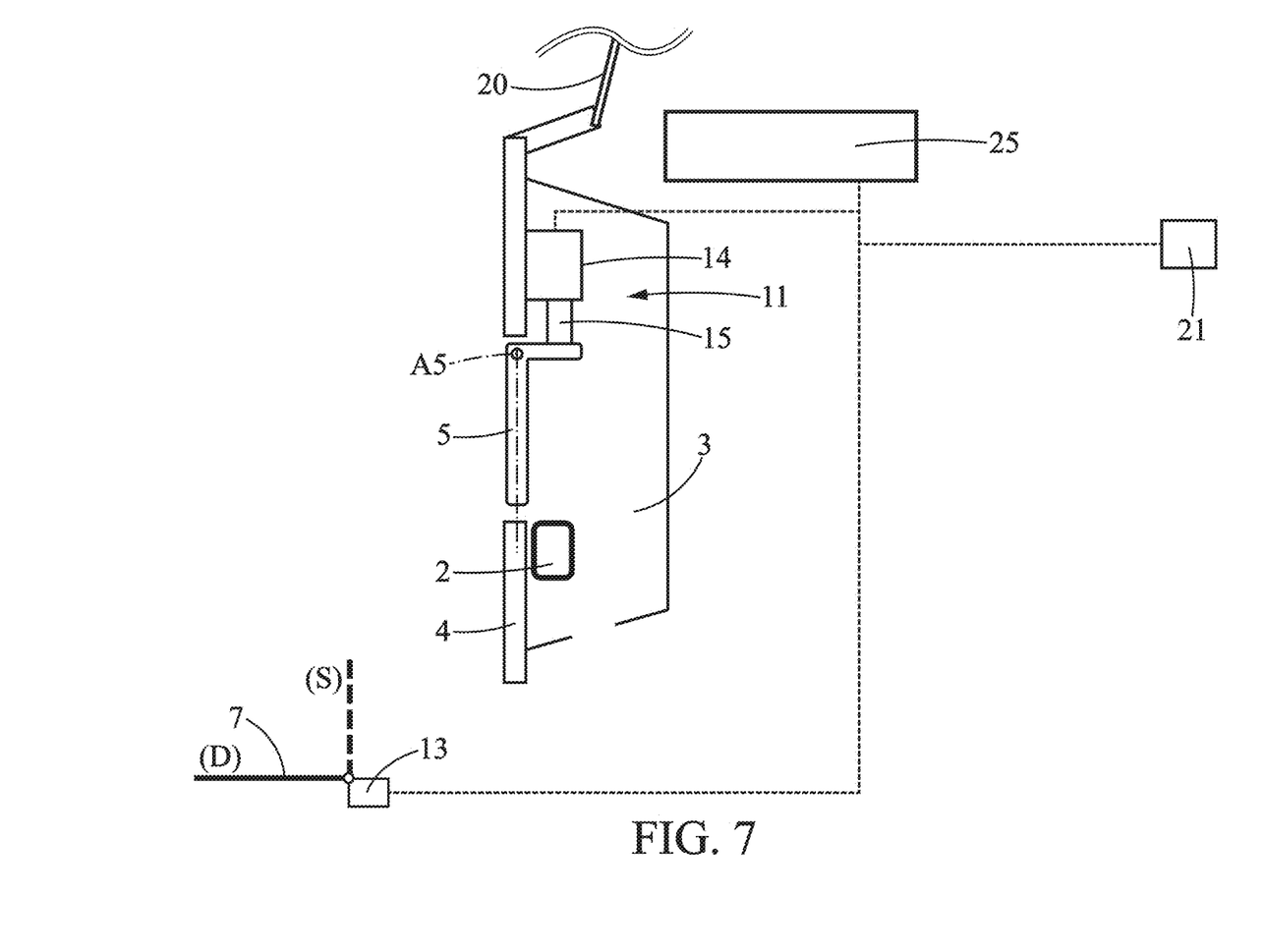
FIG. 7 is a schematic side view of a gripping system according to a sixth embodiment.

In the sixth embodiment, illustrated on FIG. 7, the gripping system comprises a position sensor 13 configured for detecting a position of the step 7, and the actuation device 11 comprises an electric motor 14 and a transmission mechanism 15 configured to move the closure member 5 from the first position C to the second position O when the step 7 is in the deployed position D.

The position sensor 13 is configured for detecting transitions between the stowed position S of the step 7 and the deployed position D of the step 7. The actuation device 11 is activated to move the closure member 5 from the first position C to the second position O when a transition from the stowed position S of the step 7 to the deployed position D of the step 7 is detected. For this, an electronic control unit 25 receives the different signals and activates or deactivates the electric motor 14 in order to control the actuation device 11 and the position of the closure member 5.

The position sensor 13 can be a switch. In this case, the output signal can only take two different values. In short, the position sensor 13 can only detect two different positions. The position sensor 13 can also deliver a continuous information. Output signal can vary continuously across a range defined by a minimum position and a maximum position. The position sensor 13 can for example be a Hall sensor associated with a magnetic target fixed to the step 7.

The electric motor 14 and the transmission mechanism 15 are configured to move the closure member 5 from the second position O to the first position C when the step 7 is in the stowed position S. The actuation device 11 is activated to move the closure member 5 from the second position O to the first position C when a transition from the deployed position D of the step 7 and the stowed position S of the step 7 is detected.

The closure member 5 is opened only when the step 7 is in the deployed position D. In short, the closure member 5 is opened only when the gripping system 1 is likely to be used.

According to an implementation of the gripping system, the transmission mechanism 15 comprises a gear train. The gear train may comprise a worm-screw which drives a gear.

In the sixth embodiment, the gripping system further comprises a safety switch 21 configured to deactivate the actuation device 11. The role of the safety switch 21 is to prevent the closure member 5 to be moved in the second position O in which the recessed area 3 is opened whereas the safety conditions are not met. In that case, the closure member 5 has to remain in the first position C in which the closure member closes the recessed area 3. Therefore, the gripping member 2 remains unusable as long as the safety conditions are not met.

The truck 100 comprises an ignition key with two stable positions. A first stable position is a powered-down position in which the various electric systems of the truck are deactivated. A second stable position is a powered-up position in which the various electric systems of the truck are activated. The second position is the position in which the truck is driven.

The safety switch 21 is configured to deactivate the actuation device 11 when the ignition key of the truck is in the powered-up position. The safety switch 21 prevents the actuation device 11 to move the closure member 2 in the second position O when the ignition key of the truck is in the powered-up position. The closure member 5 thus remains in the closed position C when the ignition key is on. The risk of having someone starting to climb over the vertical surface 50 of the truck 100 while the truck 100 is ready to be driven is eliminated. The hazardous situation is avoided.

In the illustrated embodiments, the bodywork element 4 in which the grip member 2 is installed is a front surface of the truck 100. The grip member 2 may extend transversely along the full width of the truck 100.

The truck 100 may comprise at least two gripping systems as described earlier, the gripping systems being disposed at different locations of the truck 100. The user can get support for various work positions in front of the windscreen 20 of the truck 100.

The truck 100 may comprise at least two gripping systems as described earlier. The gripping systems are disposed at different locations of the truck 100. The user can get support for various work positions in front of the windscreen 20 of the truck 100.

The at least two gripping systems may have a common closure member 5. In other words, the at least two gripping systems have individual grip members 2 and share a common closure member 5.

The at least two gripping systems may be independent. In other words, each gripping system has its own closure member 5 and its own associated grip member 2.

The invention claimed is:

1. A gripping system for helping a user climbing over a substantially vertical surface of an industrial vehicle, the gripping system comprising:

a grip member installed in a recessed area of a bodywork element, and
a flap movable relative to the grip member and to the recessed area, between:
   a first position, in which the flap closes the recessed area for concealing the grip member in the recessed area, and
   a second position, in which the flap is opened so as to enable the grip member contained in the recessed area to be grasped by the user through the opened flap for supporting at least a fraction of a weight of the user as the grip member is in the recessed area,
   wherein the flap is configured for moving from the first position to the second position at least under a pushing action of the user against the flap,
   wherein the flap is moved inwards of the recessed area when the flap is moved from the first position to the second position.

2. The gripping system of claim 1, wherein the flap is configured to be flush with the bodywork element when the flap is in the first position.

3. The gripping system of claim 1, further comprising an elastic spring configured to deform when the flap is moved from the first position to the second position.

4. The gripping system of claim 3, wherein the elastic spring is preloaded so that a minimal force to be exerted to move the flap from the first position to the second position is higher than a predetermined threshold.

5. The gripping system of claim 1, wherein the flap is rotatable about a rotation axis.

6. The gripping system of claim 5, wherein the rotation axis of the flap is horizontal when the gripping system is oriented in a nominal installation position in the industrial vehicle.

7. The gripping system of claim 1, wherein the grip member is a handle.

8. The gripping system of claim 1, further comprising:
a step rotatable between a stowed position and a deployed position, and
a locking mechanism configured to block the flap when the step is in the stowed position and configured to release the flap when the step is in the deployed position.

9. The gripping system of claim 1, further comprising:
a step rotatable between a stowed position and a deployed position, and
an actuation device configured for moving the flap from the first position to the second position when the rotatable step is moved from the stowed position to the deployed position.

10. The gripping system of claim 9, wherein the actuation device comprises a cable linking the flap and the step.

11. The gripping system of claim 9, further comprising a position sensor configured for detecting a position of the step, in which the actuation device comprises an electric motor and a transmission mechanism configured to move the flap from the first position to the second position when the step is in the deployed position.

12. The gripping system of claim 11, further comprising a safety switch configured to deactivate the actuation device.

13. The gripping system of claim 11, wherein the transmission mechanism comprises a gear train.

14. A truck comprising the gripping system of claim 1.

15. The truck of claim 14, in which the bodywork element in which the grip member is installed is a front surface of the truck.

* * * * *